United States Patent [19]

Hoh

[11] 3,869,416

[45] Mar. 4, 1975

[54] REINFORCED WAX COMPOSITIONS HAVING UNIVERSAL ADHESION

[75] Inventor: George Lok-Kwong Hoh, Wilmington, Del.

[73] Assignee: E. I. du Pont de Nemours and Company, Wilmington, Del.

[22] Filed: Mar. 22, 1973

[21] Appl. No.: 343,684

[52] U.S. Cl. ............... 260/27 R, 161/250, 161/268, 260/28.5 A, 260/854
[51] Int. Cl. .............................................. C09j 3/26
[58] Field of Search ......... 260/27 R, 27 EV, 28.5 R, 260/28.5 A, 854

[56] References Cited
UNITED STATES PATENTS

| | | | |
|---|---|---|---|
| 3,201,374 | 8/1965 | Simms | 260/854 |
| 3,210,305 | 10/1965 | Coenen | 260/28.5 A |
| 3,215,678 | 11/1965 | Adelman | 260/854 |
| 3,227,669 | 1/1966 | Sauer | 260/28.5 A |
| 3,386,936 | 6/1968 | Gordy | 260/27 EV |

FOREIGN PATENTS OR APPLICATIONS

| | | | |
|---|---|---|---|
| 964,219 | 7/1964 | Great Britain | 260/27 EV |

*Primary Examiner*—Melvyn I. Marquis
*Assistant Examiner*—William E. Parker

[57] ABSTRACT

Compositions of universal adhesion are provided comprising (I) petroleum wax reinforced with ethylene/olefin copolymer reinforcing resin and (II) an adhesion promoting system consisting essentially of (a) a polar polymeric additive such as copolymers of ethylene with vinyl esters, acrylates and unsaturated carboxylic acids or acid derivatives and (b) a tackifying resin such as wood rosin or its derivatives.

10 Claims, No Drawings

REINFORCED WAX COMPOSITIONS HAVING UNIVERSAL ADHESION

BACKGROUND OF THE INVENTION

Petroleum waxes have been used for many years as coatings for paper, paperboard, food products such as fruit, meats, and cheeses, and other materials where protective water-proof, moisture vapor impermeable coating are required. However, it has long been recognized that unmodified petroleum waxes are generally unsatisfactory for such use. Because of inherent deficiencies in such physical properties as adhesivity, flexibility, hardness, and tensile strength, the wax coating is easily cracked, chipped, and peeled off the substrate.

The literature reports many attempts to provide improved reinforced wax compositions. In particular, it has been noted that by modifying petroleum wax with ethylene/olefin copolymers the wax can be reinforced. While by the use of such copolymers in specific amounts, wax-based coating compositions can be fashioned with desirable viscosities and strength properties such as flexibility, hardness, and tensile strength, obtaining the appropriate amount of adhesivity to all substrates, i.e., universal adhesivity, has been a continuing problem. For example, a particular wax composition reinforced with an ethylene/olefin copolymer may exhibit good adhesion to certain types of substrates, e.g., non-polar, and poor adhesion to others, e.g., polar. Thus, before a compounder can prepare a composition, he must know his customer's particular requirements and formulate accordingly. This need for individual formulation is highly undesirable and results in increased composition cost.

SUMMARY OF THE INVENTION

According to the present invention there are provided compositions comprising (I) petroleum wax reinforced with ethylene/olefin copolymer reinforcing resin and wherein the olefin comonomer is $C_3$-$C_{18}$ alpha-olefin and/or unconjugated diolefin (II) an adhesion promoting system consisting essentially of (a) a polar polymeric additive selected from (1) an ethylene/organic ester copolymer containing at least 85 mole percent copolymerized ethylene and at least 9.5 mole percent of a copolymerized vinyl alcohol ester of a $C_1$-$C_4$ saturated monocarboxylic acid or at least 7 mole percent of a copolymerized $C_1$-$C_5$ saturated aliphatic alcohol ester of acrylic or methacrylic acid, and (2) an ethylene/carboxylic acid or anhydride copolymer containing at least 85 mole percent copolymerized ethylene and 0.15-5 mole percent copolymerized acid, partial ester with $C_1$-$C_5$ alcohols or anhydride, and (b) a tackifying resin selected from wood rosin or derivatives thereof; said polar polymeric additive (a) being present in an amount of 10-30 parts and said tackifying resin (b) being present in an amount of 25-50 parts, both based upon 100 weight parts of (I).

The present compositions display excellent universal adhesion and thus can be used as protective coatings on polar as well as non-polar substrates.

DESCRIPTION OF THE INVENTION

The preparation of reinforced wax compositions useful in the present invention by employing ethylene/olefin copolymers is well known as illustrated by U.S. Pat. No. 2,728,735 (Anderson); U.S. Pat. No. 3,157,610 (Richardson); U.S. Pat. No. 3,210,305 (Coenen et al.); U.S. Pat. No. 3,227,669 (Sauer); U.S. Pat No. 3,303,150 (Coenen et al.); and U.S. Pat. No. 3,321,428 (Tordella). As evidenced by these patents, it is well known that wax compositions can be prepared with various physical properties by an appropriate selection of the reinforcing resin and its inclusion in the appropriate amount. Thus, depending on the properties desired in the end use application, reinforced wax compositions for use herein can be fashioned using these copolymers with a variety of tensile strengths, flexibilities, and viscosities. Ethylene/olefin copolymers useful in the present invention are copolymers of ethylene with $C_3$-$C_{18}$ alpha-olefins and/or with unconjugated diolefins. In these copolymers, the amount of copolymerized ethylene is generally more than about 50 mole percent. Among the alpha-olefins suggested as being preferred are those containing less than about nine carbon atoms such as propylene, n-butene, n-hexene, and n-octene. In copolymers with these preferred alpha-olefins, the amount of copolymerized ethylene is preferably 65-95 mole percent. A particularly useful diolefin comonomer is 1,4-hexadiene which is either copolymerized alone with ethylene or copolymerized with ethylene and another monomer such as propylene.

As with the selection of the particular reinforcing resin, the amount of such resin used in the composition is generally determined by the properties desired. For example, blend flexibility and viscosity can be increased by increasing the amount of reinforcing resin in the blend. On the other hand, with increasing amounts of resin, the moisture vapor permeability resistance of the coating is progressively diminished. For most applications, the reinforced wax composition contains at least about 50 weight percent, preferably at least about 60 weight percent, wax and at least about 0.1 weight percent, preferably at least 10 weight percent, reinforcing resin. Additionally, the molecular weight of the reinforcing resin influences the determination of the appropriate amount in which it should be included. With high molecular weight resins, i.e., those having molecular weights corresponding to melt indexes of less than 10 (ASTM D-1238 Condition E), substantial reinforcement and viscosity build can be obtained with relatively small amounts of reinforcing resin addition. While low molecular weight resins can also be used, they are generally required to be present in larger amounts to obtain a composition with the same physical properties as one containing a high molecular weight reinforcer.

The petroleum wax useful herein is not especially limited and can be either a paraffin wax, a microcrystalline wax, or mixtures thereof. Paraffin wax is a mixture of solid hydrocarbons derived from the overhead wax distillate fraction obtained from the fractional distillation of petroleum. After purification, the paraffin wax contains hydrocarbons that fall within the formulae $C_{23}H_{48}$-$C_{35}H_{72}$. It is substantially colorless, hard, and translucent material usually having a melting point of about 125°-165°F. Microcrystalline was is obtained from the non-distillable still residues from the fractional distillation of petroleum. It differs from paraffin wax in having branched hydrocarbons of higher molecular weights. It is considerably more plastic than paraffin wax and usually has a melting point of about 150°-200°F.

Table I illustrates how the tensile strength (T.S. in p.s.i.) and tensile elongation (T.E. in percent) of ethylene/olefin copolymer-wax blends are affected by different types of copolymers and copolymer amounts. The wax used in these blends was a highly refined paraffin wax with a melting point of about 146°F. ("Aristowax" 143/150). Tensile data were obtained using a standard Instron tester at 72°F., 50 percent relative humidity, and at a crosshead speed of 1 inch per minute, in accordance with ASTM D–1708 at 114 percent extension/minute.

TABLE I

| Olefin in Ethylene Olefin Copolymer | Mole % Olefin | Copolymer Melt Index[1] | Wt.% Copolymer/ Wt.% Wax | T.S. | T.E. |
| --- | --- | --- | --- | --- | --- |
| Propylene | 35 | 7.7 | 30/70 | 610 | 18 |
| Butene-1 | 13 | 7.2 | 30/70 | 815 | 19 |
| Octene-1 | 11.2 | 4.8 | 30/70 | 660 | 100 |
| Octene-1 | 10.5 | 8.6 | 25/75 | 850 | 18 |
| Octene-1 | 10.5 | 8.6 | 60/40 | 2400 | 930 |
| Octene-1 | 15.3 | 19 | 30/70 | 530 | 40 |
| Octene-1 | 15.3 | 19 | 40/60 | 830 | 550 |
| Octene-1 | 11.4 | 40 | 30/70 | 610 | 70 |
| Octene/Propylene | 0.6/23.6 | 8.7 | 30/70 | 731 | 17 |
| Octene/Propylene | 0.6/23.6 | 8.7 | 60/40 | 1300 | 800 |
| Octene/Propylene | 3.2/12.3 | 8.6 | 30/70 | 520 | 33 |
| Octene/Propylene | 3.2/12.3 | 8.6 | 35/65 | 603 | 180 |
| Octene/Propylene | 3.2/12.3 | 8.6 | 40/60 | 850 | 680 |
| Octene/Propylene | 4.6/6.1 | 7.7 | 30/70 | 560 | 44 |
| 1,4-hexadiene | 11 | 1.67[2] | 30/70 | 1270 | 890 |
| 1,4-hexadiene | 11 | 1.67[2] | 20/80 | 490 | 80 |

[1] ASTM D-1238 Condition E (190°C–2160 g.)
[2] Inherent viscosity

In order to obtain the desired degree of adhesivity, there is included in the reinforced wax compositions described above an adhesion-promoting system consisting essentially of particular polar polymeric additives and particular tackifying resins. The polar polymeric additives are selected from two classes of ingredients. The first class comprises copolymers of ethylene with specific copolymerizable organic esters selected from the vinyl alcohol esters of $C_1$–$C_4$ saturated monocarboxylic acids and the $C_1$–$C_5$ saturated aliphatic alcohol esters of acrylic or methacrylic acid. Useful ester monomers include, among others, vinyl formate, vinyl acetate, vinyl propionate, methyl acrylate, ethyl acrylate, methyl methacrylate, isobutyl acrylate, n-butyl methacrylate, isobutyl methacrylate, etc. To be effective in the present invention such ethylene/ester copolymeers must contain at least 9.5 mole percent copolymerized ester in the case of the vinyl alcohol esters and at least 7 mole percent in the case of the acrylic or methacrylic acid esters. Copolymers containing lesser amounts of copolymerized ester moieties are not effective in affecting adhesion at concentrations where the other physical properties, i.e., viscosity, tensile strength, flexibility, etc., of the composition will not be appreciably altered.

With respect to the copolymerized ethylene content in the ethylene/ester copolymers, it has been found that at least 85 mole percent is necessary to ensure that the copolymer additive is at least partly soluble in either the reinforcing resin or the wax. The absence of at least partial solubility of the additive markedly reduces the additive's effectiveness in improving the composition's adhesivity. While not customary, small amounts of other copolymerized ingredients, e.g., vinyl chloride, can also be present in these copolymers. An ethylene/-vinyl acetate copolymer is an especially preferred respresentative of this class.

The second class of polar polymeric additives are copolymers of ethylene and carboxylic acids, their partial esters or anhydrides. This class includes, among others, copolymers such as those of ethylene and acrylic, methacrylic, itaconic, maleic, or fumaric acids, or their partial esters with $C_1$ to $C_5$ alcohols, as well as ethylene copolymers with the anhydrides of itaconic, maleic, or fumaric acid. For reasons similar to those given with respect to the first class of additives, the copolymerized amount of acid or anhydride in these copolymers should be at least about 0.15 mole percent and can be incorporated therein either by direct copolymerization or by graft polymerization. Further, to ensure at least partial solubility of this additive in the other ingredients, the copolymerized acid or anhydride moieties should not exceed 5 mole percent, while the copolymerized ethylene content should be at least 85 mole percent. Ethylene/methacrylic acid or maleic anhydride copolymers are especially preferred.

As with the first class of polar polymeric additives, the second class also includes copolymers containing, in addition to copolymerized ethylene, acid, ester or anhydride, other copolymerized monomers. Particularly useful as such monomers are the copolymerizable organic esters recited above with respect to the first class of additives. Ethylene/acid or anhydride copolymers additionally containing copolymerized vinyl alcohol esters are particularly suitable for use herein. Illustrative of very desirable copolymers are those wherein the vinyl alcohol ester is vinyl acetate which is present in the copolymer in an amount of about 7.5–12.5 mole percent. Reference is made to U.S. Pat. No. 3,201,374 to Simms; U.S. Pat. No. 3,215,657 to Beresniewicz and Simms; and U.S. Pat. No. 3,215,678 to Adelman as showing the preparation of many useful acid or anhydride containing copolymers.

The polar polymeric additives can be prepared by known techinques and the particular source from which they are obtained is not especially important. Also, the molecular weight of the additive is not critically limited so long as it can be intimately blended with the other ingredients of the composition. Very high molecular weights (MI less than about 0.1) or very low molecular weights (MI greater than about 500,000) are to be avoided.

The second essential ingredient in the adhesion-promoting system is a tackifying resin which can be either wood rosin or a wood rosin derivative. Wood rosin has been known and been available for many years. For a comprehensive description of it, reference is made to the article titled "Rosin and Rosin Derivatives" found in Encylcopedia of Chemical Technology, Volume II, published by Interscience Encyclopedia Incorporated at Pages 779–810. As therein set forth, wood rosin is obtained from the aged virgin pine stump and is composed of about 90 percent resin acid and about 10 percent of non-acidic material. The resin acids are monocarboxylic acids of alkylated hydrophenanthrene nuclei having two double bonds and an empirical formula of $C_{19}H_{29}COOH$. In turn, the acids can be classified into two groups, the abietic type and the pimaric type, each of which exists and is usually present in wood rosin in several isomeric and mixed forms. Also, as therein stated the non-acidic material in wood rosin is composed of a major amount of fatty acid esters.

Wood rosin derivatives are also useful in the present invention. The most common of the derivatives are the polyol esters (e.g., ethylene glycol, di- and triethylene glycol, glycerol, pentaerythritol, and mixtures thereof). However, other derivatives such as dimerized, polymerized, or disproportionated wood rosin are also useful herein. Similarly, while not essential, the wood rosin or its derivative can be highly stabilized, i.e., stripped of volatiles and hydrogenated.

Wood rosins and their polyol esters useful in the present invention are those such as sold by Hercules Incorporated under the "Foral" tradename. Among others, these include the following: "Foral" A and "Foral" AX which are characterized as being thermoplastic acidic resins produced by hydrogenating wood rosin to an exceptionally high degree, and having softening points (by the Hercules drop method) of 75°C. and acid numbers of 160; "Foral" 85 which is characterized as being a highly stabilized ester rosin having a softening point of 81°C. and an acid number of 9; "Foral" 105 characterized as being a thermoplastic ester resin derived from pentaerythritol and a highly stabilized rosin base, and having a softening point of 103°C. and an acid number of 12; and resin S1267 characterized as being a hydrogenated glycerol ester of wood rosin.

In order to achieve universal adhesion, the polar polymeric additive and the tackifying resin must be combined with the reinforced wax in particular amounts. Based on 100 weight parts of the reinforced was, i.e., the petroleum wax and the ethylene/olefin copolymer reinforcing resin, the polar polymeric additive is present in an amount of at least 10 and preferably at least 15 parts. In general, those polar polymeric additives containing acid functionality can be used in lesser amounts than can additives without such functionality. No added advantages are achieved if more than 30, and usually if more than 25, parts of the polar additive are employed. The tackifying resin is included in amounts of 25–50 parts per 100 weight parts of reinforced wax. If lesser amounts are used insufficient adhesion to non-polar substrates results; larger amounts yield coatings which are excessively tacky. Preferably, 25–45 parts of tackifying resin are used.

In preparing the compositions of the present invention, any of the well-known formulating techniques can be used. Thus, the wax, reinforcing resin, polar polymeric additive, and tackifying resin can be hot mixed together in a Banbury mixer, rubber milled, melt blended, compound extruded, or solvent dissolved and film cast. Similarly, the manner, e.g., curtain coating, extrusion, etc., in which the compositions are applied to a particular substrate is not limited.

The following examples illustrate compositions of the present invention. All parts and percentages are by weight unless otherwise indicated. Wax A is Atlantic 1116 which is a paraffin wax; Wax B is "Aristowax" 143/150 which is also a paraffin wax. "Foral" 85 is used as the tackifying resin (TR). Reinforcing Resin A is an ethylene/octene copolymer, having a melt index of 40, which contains 34 weight percent copolymerized 1-octene. Reinforcing Resin B is an ethylene/octene copolymer, having a melt index of 5, which contains 32 weight percent copolymerized 1-octene. Reinforcing Resin C is and ethylene/butene copolymer containing 25 weight percent 1-butene and having a melt index of 7.2.

TABLE II

| Example | Reinforcing Resin (RR) | Wax | Polar Polymeric Additive (PPA)* | Percent RR | Percent Wax | Percent PPA | Percent TR |
|---------|------------------------|-----|--------------------------------|-----------|-------------|-------------|------------|
| I | A | A | E/VAc/MAA (78.6)/(20)/(1.4) MI = 6.6 | 20 | 50 | 10 (14.3)** | 20 (28.6) |
| II | A | B | Same as I | 20 | 45 | 10 (15.5) | 25 (28.5) |
| III | C | A | Same as I | 20 | 50 | 10 (14.3) | 20 (28.6) |
| IV | C | A | E/VAc (72)/(28) MI = 6 | 20 | 50 | 10 (14.3) | 20 (28.6) |
| V | B | B | E/VAc/MAA (74.4)/(25)/(0.6) MI = 150 | 15 | 45 | 15 (25) | 25 (41.6) |
| VI | B | B | E/IBA E/MANH*** (71)/(29) (99)/(1) MI = 34 MI = 3000 | 15 | 45 | 15 (25) | 25 (41.6) |
| VII | B | B | E/VAc/MAA (71.25)/(28)/(0.75) MI = 6 | 15 | 45 | 15 (25) | 25 (41.6) |
| VIII | B | A | Same as VII | 15 | 45 | 15 (25) | 25 (41.6) |
| IX | B | B | E/VAc/MAA (78.6)/(20)/(1.4) MI = 7 | 20 | 45 | 10 (15.5) | 25 (28.5) |

\* The following abbreviations are used. Numbers in parenthesis under the abbreviations refer to compositional make-up as percent by weight:
MI — melt index
E — ethylene
VAc — vinyl acetate
MAA — methacrylic acid
IBA — isobutyl acrylate
MANH — Maleic anhydride
\*\* Numbers in parenthesis are parts per 100 weight parts of combined wax and reinforcing resin.
\*\*\* 75 percent E/IBA combined with 25 percent E/MANH.

The following table illustrates the adhesive performance of the first four of above compositions on a number of different types of substrates. Peel strength test results were obtained by using an "Instron" tensile tester operated at 5 in./min., the sample being held to maintain a 90° peel angle. Samples were prepared by coating the compositions onto bleached sulfate paper to a thickness of 1 mil and then heat sealing the coating to the indicated substrates at a 4 p.s.i. jaw pressure, 0.75 sec. dwell time, and temperatures as shown below using a "Sentinel" heat sealer:

1. Polyethylene: 200°F.
2. DSF, Polyethylene/Polypropylene Composite film, sealed to polypropylene side: 225°F.
3. All other substrates: 250°F.

TABLE III

| Substrate 1 | Substrate 2 | Peel Strength in g./in. Using the Composition of Example | | | |
|---|---|---|---|---|---|
| | | I | II | III | IV |
| 50 lb. Bleached Sulfate Paper (P) | Polyethylene (N)* | ** | ** | ** | ** |
| do. | Glassine (P) | 35 | 120 | 75 | 220 |
| do. | Coated Cellophane (P) ("K-Cello") | 310 | ** | ** | 10 |
| do. | Aluminum Foil (P) | 350 | ** | ** | 25 |
| do. | Polyethylene Terephthalate (P) ("Mylar") | ** | ** | ** | ** |
| do. | Coated Polypropylene (P) ("Clysar" PP) | ** | ** | ** | ** |
| | Polypropylene (N) | | | | |
| do. | Pollock | ** | ** | ** | ** |
| do. | Hercules BX-100 | ** | ** | ** | 400 |
| do. | Hercules B-501 (untreated side) | 70 | 380 | ** | 420 |
| do. | Crown Zellerbach DSF | 95 | ** | 110 | 300 |
| | Treated Polypropylene (P) | | | | |
| do. | "Clysar" | 300 | ** | ** | ** |
| do. | Hercules B-501 (treated side) | 200 | ** | ** | ** |

*N - non-polar; P - polar; **Fiber tear

The degree of universal adhesion is quantitatively evaluated by rating the performance of the above adhesives to each of the substrates using the following standard: If the adhesive gave a fiber tear bond, it was rated 6; if a peel strength of over 300 but no fiber tear, it was rated 5; if a peel strength of 200-229, it was rated 4; if a peel strength of 100-199, it was rated 3; if a peel stength of 50-99, it was rated 1; below 50, the rating was 0. After rating the adhesive in each lamination, the ratings were added together to give a universal adhesive factor. Since each adhesive was used in making 12 laminates, a perfect universal adhesive would have a universal adhesive factor of 72. An adhesive having a factor above 30 is considered to be suitable as a universal adhesive. The Example I-IV adhesives had the following factors:

| Example | Universal Adhesive Factor |
|---|---|
| I | 50 |
| II | 67 |
| III | 63 |
| IV | 54 |

The adhesive compositions of Examples V-IX were used in preparing glassine/glassine and glassine/polypropylene laminates. The laminates were prepared by coating one or both of the laminae with the adhesive to a thickness of 1 mil and thereafter sealing to the other lamina in a manner similar to that described for the previous samples. The peel strength of the laminates, measured as described above, is given in Table IV.

TABLE IV

| Example | Coated Glassine/ Coated Glassine | Coated Glassine/ Uncoated Glassine | Coated Glassine/ Coated PP | Coated Glassine/ Uncoated PP |
|---|---|---|---|---|
| V | 243 | 50 | 353 | 358 |
| VI | ** | ** | ** | 245 |
| VII | ** | ** | ** | 188 |
| VIII | ** | 62 | 430 | 210 |
| IX | ** | 15 | 148 | 312 |

**Fiber tear.

I claim:

1. An adhesive composition comprising (I) petroleum wax reinforced with ethylene/olefin copolymer reinforcing resin wherein the olefin comonomer is $C_3$-$C_{18}$ alpha-olefin and/or unconjugated diolefin and (II) an adhesion promoting system consisting essentially of:

a. a polar polymeric additive selected from
      1. an ethylene/organic ester copolymer containing at least 85 mole percent copolymerized ethylene and at least 9.5 mole percent of a copolymerized vinyl alcohol ester of a $C_1$-$C_4$ saturated monocarboxylic acid or at least 7 mole percent of a copolymerized $C_1$-$C_5$ saturated aliphatic alcohol ester of acrylic or methacrylic acid, and
      2. an ethylene/carboxylic acid or anhydride copolymer containing at least 85 mole percent copolymerized ethylene and 0.15-5 mole percent copolymerized acid, or acid partial ester with $C_1$-$C_5$ alcohols, or anhydride, and
   b. a tackifying resin selected from wood rosin or derivatives thereof; said polar polymeric additive (a) being present in an amount of 10-30 parts and said tackifying resin (b) being present in an amount of 25-50 parts, both based upon 100 weight parts of (I).

2. The composition of claim 1 wherein the polar polymeric additive (a) is an ethylene/carboxylic acid or anhydride copolymer containing at least 85 mole percent copolymerized ethylene and 0.15–5 mole percent copolymerized acid, partial ester with $C_1$–$C_5$ alcohols, or anhydride.

3. The composition of claim 2 wherein the polar polymeric additive (a) is selected from ethylene/acrylic or methacrylic acid copolymers, ethylene/maleic anhydride copolymers, ethylene/vinyl acetate/methacrylic acid copolymers of ethylene/methyl methacrylate/methacrylic acid copolymers.

4. The composition of claim 3 wherein, per 100 weight parts of (I), said polar polymeric additive (a) is present in an amount of 15–25 parts and said tackifying resin is present in an amount of 25–45 parts.

5. The composition of claim 1 wherein said polar polymeric additive (a) is an ethylene/organic ester copolymer containing at least 85 mole percent copolymerized ethylene and at least 9.5 mole percent of a copolymerized vinyl alcohol ester of a $C_1$–$C_4$ saturated monocarboxylic acid or at least 7 mole percent of a copolymerized $C_1$–$C_5$ saturated aliphatic alcohol ester of acrylic or methacrylic acid.

6. The composition of claim 5 wherein the polar polymeric additive is an ethylene/vinyl acetate copolymer.

7. The composition of claim 6 wherein, per 100 weight parts of I, said polar polymeric additive (a) is present in an amount of 15–25 parts and said tackifying resin is present in an amount of 25–45 parts.

8. The composition of claim 1 wherein said tackifying resin is a polyol ester of wood rosin.

9. The composition of claim 4 wherein said tackifying resin is a polyol ester of wood rosin.

10. The composition of claim 7 wherein said tackifying resin is a polyol ester of wood rosin.

* * * * *